United States Patent
Ho et al.

[19]

[11] Patent Number: 6,061,502

[45] Date of Patent: May 9, 2000

[54] COMMUNICATIONS DEVICE WITH REMOTE DEVICE IDENTIFIER RECOGNITION AND TRANSMISSION IN ACCORDANCE WITH THE RECOGNIZED IDENTIFIER

[75] Inventors: Shu-Kuang Ho, Carlisle; William Agudelo, Arlington; Yaun-Kong Wang, Andover, all of Mass.; Carlos I. Mainemer, Nashua, N.H.

[73] Assignee: Biscom Ltd., Chelmsford, Mass.

[21] Appl. No.: 09/149,643

[22] Filed: Sep. 8, 1998

Related U.S. Application Data

[63] Continuation of application No. 08/646,621, May 8, 1996, Pat. No. 5,805,298, which is a continuation-in-part of application No. 08/595,911, Feb. 6, 1996, abandoned.

[51] Int. Cl.⁷ ........................................................ H04N 1/32
[52] U.S. Cl. .......................... 395/114; 358/402; 358/438; 358/440
[58] Field of Search ..................... 358/402, 403, 358/434, 435, 436, 437, 438, 440, 442, 468; 395/114; 379/93.24, 93.31, 100.08; 709/200, 207, 220, 230, 238, 239, 240

[56] References Cited

U.S. PATENT DOCUMENTS

| | | | |
|---|---|---|---|
| 4,902,881 | 2/1990 | Janku | 235/381 |
| 4,918,588 | 4/1990 | Barrett et al. | 707/10 |
| 4,941,170 | 7/1990 | Herbst | 379/100.07 |
| 5,115,326 | 5/1992 | Burgess et al. | 358/440 |
| 5,247,591 | 9/1993 | Baran | 382/179 |
| 5,265,033 | 11/1993 | Vajk et al. | 709/206 |
| 5,293,250 | 3/1994 | Okumura et al. | 358/402 |
| 5,333,266 | 7/1994 | Boaz et al. | 709/206 |
| 5,339,156 | 8/1994 | Ishii | 358/402 |
| 5,396,546 | 3/1995 | Remillard | 379/93.24 |
| 5,446,667 | 8/1995 | Oh et al. | 705/406 |
| 5,461,488 | 10/1995 | Witek | 358/402 |
| 5,461,667 | 10/1995 | Remillard . | |
| 5,517,324 | 5/1996 | Fite, Jr. et al. | 358/434 |
| 5,530,740 | 6/1996 | Irribarren et al. | 379/93.24 |
| 5,563,957 | 10/1996 | Ueno et al. | 382/173 |
| 5,608,786 | 3/1997 | Gordon | 379/100.08 |
| 5,666,489 | 9/1997 | Fite, Jr. et al. | 709/220 |
| 5,675,507 | 10/1997 | Bobo, II | 709/206 |
| 5,692,039 | 11/1997 | Brankley et al. | 379/229 |
| 5,712,907 | 1/1998 | Wegner et al. | 379/112 |
| 5,881,233 | 3/1999 | Toyoda et al. | 709/233 |

*Primary Examiner*—Edward L. Coles
*Assistant Examiner*—Joseph R. Pokrzywa
*Attorney, Agent, or Firm*—Banner & Witcoff, Ltd.

[57] ABSTRACT

A communications device transmits and receives information in accordance with both facsimile and electronic mail communications protocols. The communications device recognizes a destination identifier, identifying a remote communications device as either a facsimile device or an e-mail device and transmits a document in accordance with the communications protocol utilized by the identified device. The communications device also allows the retrieval of electronic mail messages stored at a remote electronic mailbox. A user enters an electronic mail address, from which messages are desired to be retrieved, and presses a Retrieve button. The communications device initiates communication with an electronic post office corresponding to the entered electronic mail address and causes transmission of electronic mail messages stored in the specified mailbox.

1 Claim, 6 Drawing Sheets

COMMUNICATIONS DEVICE WITH REMOTE DEVICE IDENTIFIER RECOGNITION AND TRANSMISSION IN ACCORDANCE WITH THE RECOGNIZED IDENTIFIER

RELATED APPLICATIONS

This application is a continuation of U.S. Ser. No. 08/646,621, filed on May 8, 1996, now U.S. Pat. No. 5,805,298, entitled Communications Device with Remote Device Identifier Recognition and Transmission In Accordance with the Recognized Identifier, which is a continuation-in-part of U.S. Ser No. 08/595,911, filed on Feb. 6, 1996, now abandoned, entitled "Message Processing Machine" and assigned to the assignee of the present application.

FIELD OF THE INVENTION

This invention relates in general to the field of electronic communications devices and in particular to devices which transmit and receive data in accordance with facsimile and electronic mail transmission protocols.

BACKGROUND OF THE INVENTION

Facsimile (fax) devices are a popular mechanism for transmission of information. The devices are relatively easy to use and the transmission is rapid and cost-effective. Moreover, the paper input and output of most fax machines appeals to those who prefer paper copies of documents and are not comfortable with transmitting and receiving information by way of a computer. For those more comfortable with computers, electronic mail (e-mail) is an even more rapid and cost effective method of transmitting information. Documents which are created upon a computer (as most documents are) can be transmitted, received and reviewed without generation of a paper copy if compatible viewing software is available. The increasing use by organizations of private wide area networks and more significantly, the increasing accessibility of public wide area networks (WANs) such as the Internet makes e-mail even more useful by allowing transmission to a much wider group of users.

To date, facsimile devices and electronic mail devices have for the most part been separate, with facsimile type communication being performed by a specialized fax machine and e-mail communication being performed by a general purpose desktop type computer. A user who wishes to transmit a document via e-mail must have access to a desktop computer, and a user who wishes to fax a document must use a separate fax machine. While general purpose computers, when configured appropriately with a fax/data modem which receives and transmits in accordance with both facsimile and data communications protocols, can transmit and receive documents in accordance with a fax or e-mail protocol, such operations are not always easy and often require a general knowledge of the use of the computer's operating environment.

For example, a desk-top computer which has the hardware necessary to transmit and receive e-mail and fax messages must also be loaded with a program which is capable of transmitting and receiving e-mail messages and a program which is capable of transmitting and receiving fax messages. If the desk-top computer transmits and receives e-mail and fax messages to and from a modem coupled to the computer across a local area network (LAN), such as found in many office environments, access to the network must typically be obtained by entry of an appropriate user-name and password. In other environments such as the home environment, the desk-top computer is not coupled to a LAN and access to a network is obtained by way of a telephone connection with a commercial provider of electronic mail access to a private WAN or to a public WAN such as the Internet. In either environment, the user must interact with the computer's operating system, and the program(s) required to transmit and receive fax and e-mail messages. In addition, if the user wishes to transmit a document which is in paper form, the document must first be converted into a digital format via a scanner. In such a situation, the user must also interact with software which controls operation of the scanner to generate a file containing digital data indicative of the scanned image which is in a format recognizable by the software controlling operation of the fax/modem.

As can be seen from the foregoing, such operations require a number of steps including obtaining a properly configured computer and interacting with the programs on the computer to achieve the desired communication.

SUMMARY OF FEATURES AND ADVANTAGES OF THE INVENTION

It is a primary object of the present invention to provide an easy to use communications device which transmits and receives information in accordance with both facsimile and electronic mail communications protocols. In accordance with this objective, an easy to use communications device is described herein which recognizes a destination identifier, identifying a remote communications device as either a facsimile device or an e-mail device, and which transmits a document in accordance with the communications protocol utilized by the identified device. The communications device advantageously provides an easy to use interface with a limited number of required inputs in order to transmit a document, thus eliminating the need, as required by desk-top computers, for the user to have knowledge about the use of specific programs and/or operating systems. A user wishing to transmit a document places the paper document to be transmitted in a scanner, enters the destination identifier, which is either a telephone number or an electronic mail address and presses a transmit button. The communications device determines whether the destination identifier is a telephone number or an electronic mail address and transmits the document in accordance with a communications protocol corresponding to the identified type of device.

In accordance with a further object of the invention, the communications device allows the retrieval of electronic mail messages stored at a remote electronic mailbox. A user enters an electronic mail address, from which messages are desired to be retrieved, and presses an e-mail retrieve button. The communications device initiates communication with a post office corresponding to the entered electronic mail address and causes transmission of electronic mail messages stored in the specified mailbox. The communications device advantageously allows the user to select retrieval of all messages in the mailbox or to select retrieval of a listing of all messages in the mailbox. With either selection the retrieved information is printed for review by the user. If a listing has been selected, the printed listing includes a unique identification of each mail message. The user may then enter the identification of each message desired to be retrieved. The communications device responds by retrieving and printing each selected message.

The communications device summarized above and described in further detail below is preferably enclosed in a single housing and advantageously provides an easy to use and flexible mechanism for transmission of information to others. By allowing a user to select the form in which the transmitted document will be received, the communications device allows the communication to be tailored to the communication preferences of the recipient.

These and other features and advantages of the present invention may be better understood by considering the following detailed description of certain preferred embodiments of the invention. In the course of this description, reference will be made to the attached drawings.

DETAILED DESCRIPTION

Figure 1:
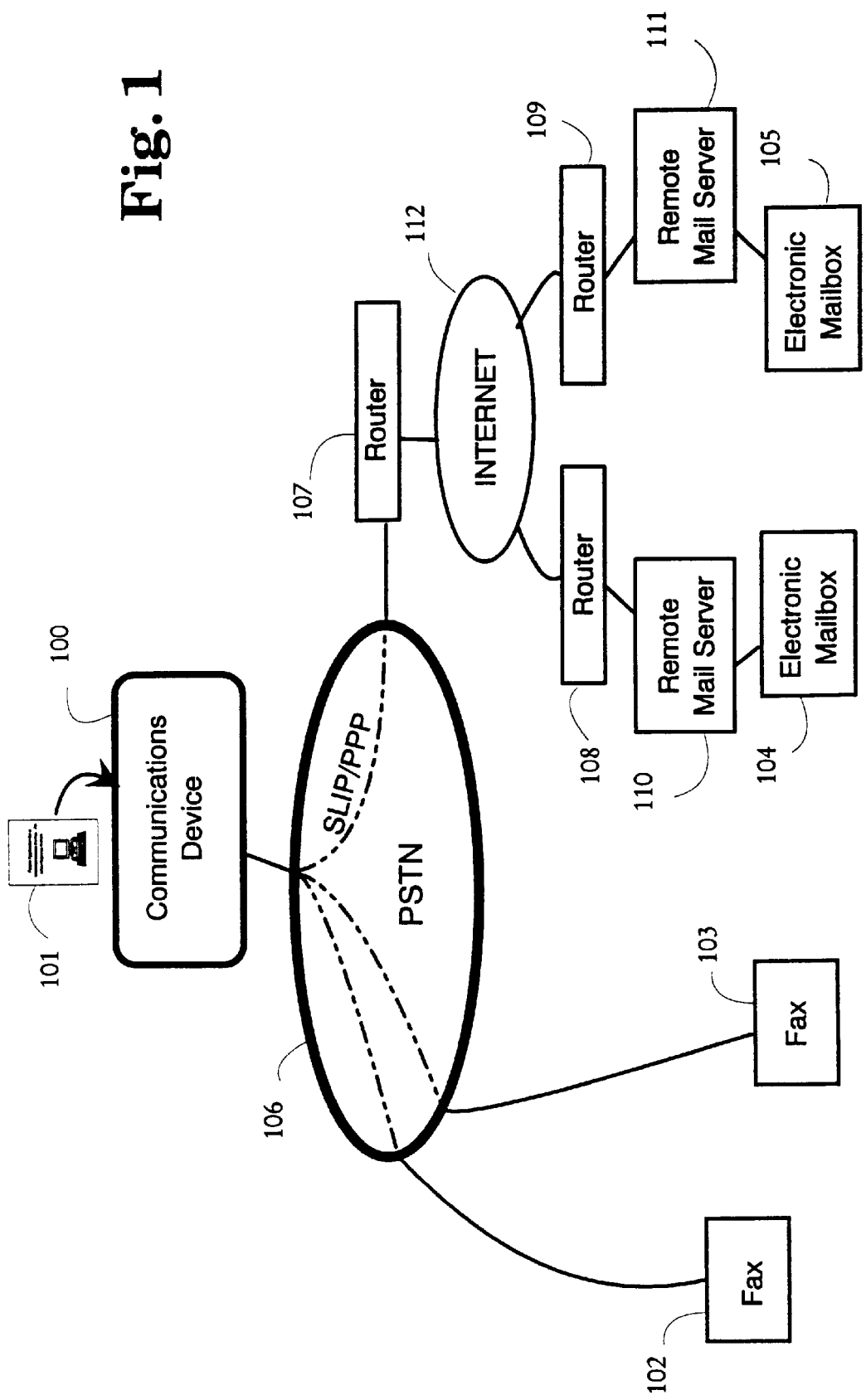
FIG. 1 is a schematic illustration of a preferred communications device coupled to communicate with remote communications devices.

In FIG. 1 a communications device 100 operates in accordance with the principles of the invention to transmit information contained in a document 101, and also receive information, with a plurality of remotely located communications devices seen at 102–105. Communications device 100 transmits and receives information in accordance with a facsimile communications protocol with facsimile devices 102–103, and transmits and receives information in accordance with an electronic mail communications protocol with electronic mailboxes 104–105. As seen in FIG. 1, communications device 100 communicates in accordance with a facsimile communications protocol as defined by CCITT Group III over the Public Switched Telephone Network (PSTN) 106. Electronic mail communications are performed by establishing over PSTN 106 a communications link in the form of a Serial Line Internet Protocol (SLIP) or a Point to Point Protocol (PPP), (collectively termed "SLIP/PPP") over the PSTN 106 with Router 107 which provides a connection to the high-speed backbone of the Internet in order to transmit and receive information between the communications device 100 and the Internet. The Router typically transmits and receives electronic mail messages in accordance with the Simple Mail Transfer Protocol (SMTP) utilized by the TCP/IP (Transmission Control Protocol/Internet Protocol) suite of protocols. As will be appreciated by those skilled in the art, the TCP/IP group of protocols is a widely used set of communications protocols. The general structure and features of the TCP/IP are discussed in "Special Edition, Using the Internet. Second Edition," (1985, Ch. 12, by Tim Parker, available from Que® Corporation, Indianapolis, Ind. 46290). As will be understood by those skilled in the art in view of the present disclosure, the term router is used to designate the function performed by module 107 which provides a connection between two networks which both operate in accordance with the same type of protocol; in this case—TCP/IP. The function(s) performed by routers 107–109 may be performed by a commercial service which provides access to the Internet via a dial-up connection. Remote Mail Servers, seen at 110–111, each implement electronic mailboxes of the type seen at 104–105 to receive electronic mail messages.

The configuration of FIG. 1 is merely illustrative of one manner of coupling the communications device 100 to remote electronic mailboxes. Connections between the communications device 100 and the Internet 112 may take several forms. For example, the communications device 100 may be coupled to the Router 107 by way of a LAN, and thus bypass the PSTN 106. If the PSTN 106 is employed to connect with the Router 107, the connection may take one of several forms including dial-up lines or more permanent connections in the form of leased lines.

Figure 2:
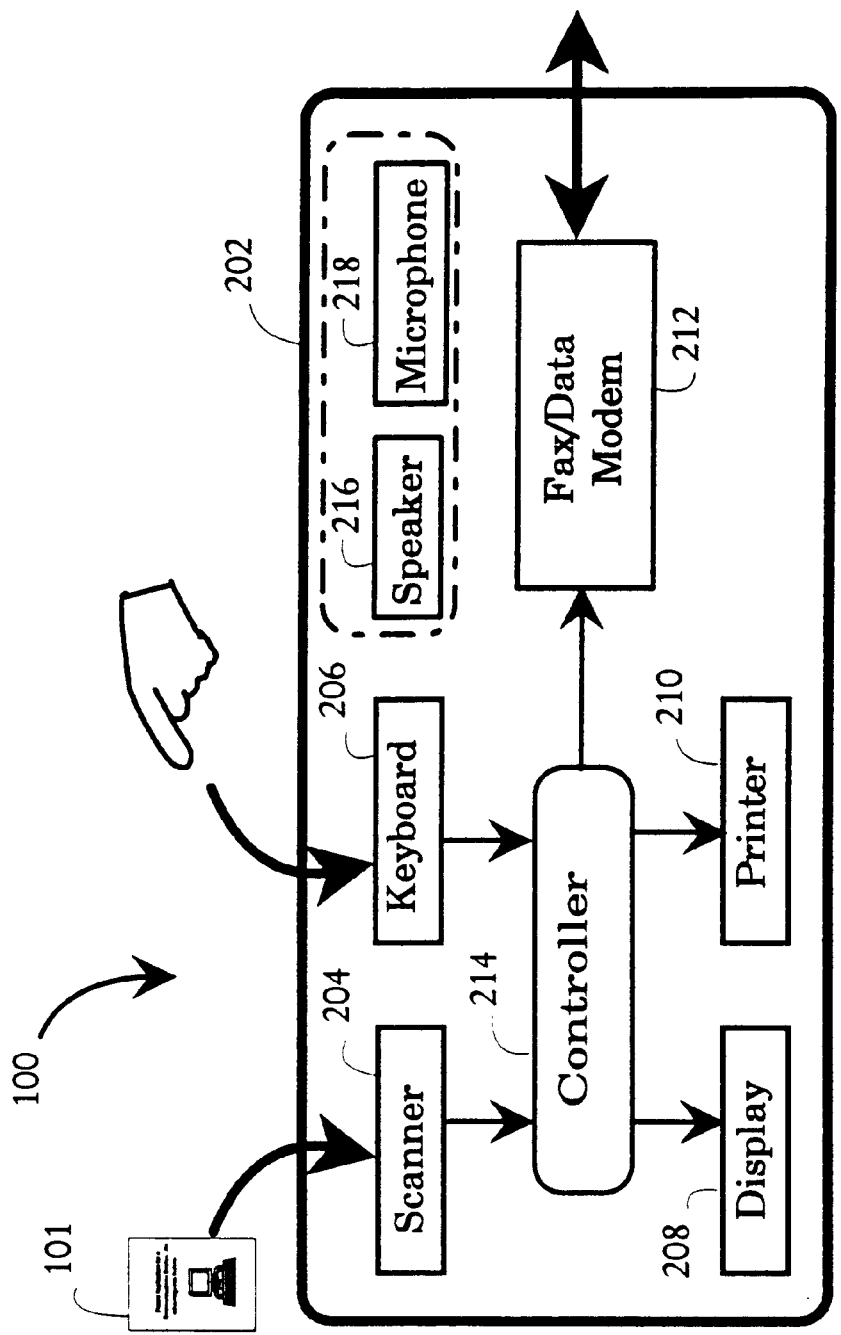
FIG. 2 is a block diagram showing the principle hardware components of a preferred embodiment.

FIG. 2 shows a block diagram of the principle hardware components 204–214 of the communications device 100. The components 204–214 are preferably enclosed in a single housing 202. A scanner 204 receives document 101 and generates digital data indicative of the information contained on the document 101. The scanner 204 may take the form of a ScanJet 4Si from Hewlett-Packard Corporation. The ScanJet 4Si is a black and white scanner which produces a resolution up to 300 dots per inch (dpi). Other types of scanners which produce resolutions either higher or lower than 300 dpi may also be used. For example, 200 dpi may be used to reduce the amount of data to be transmitted, while maintaining acceptable resolution. As also seen in FIG. 2, the communications device in certain embodiments may also contain a speaker 216 for output of information and a microphone 218 for input of information.

Figure 2A:
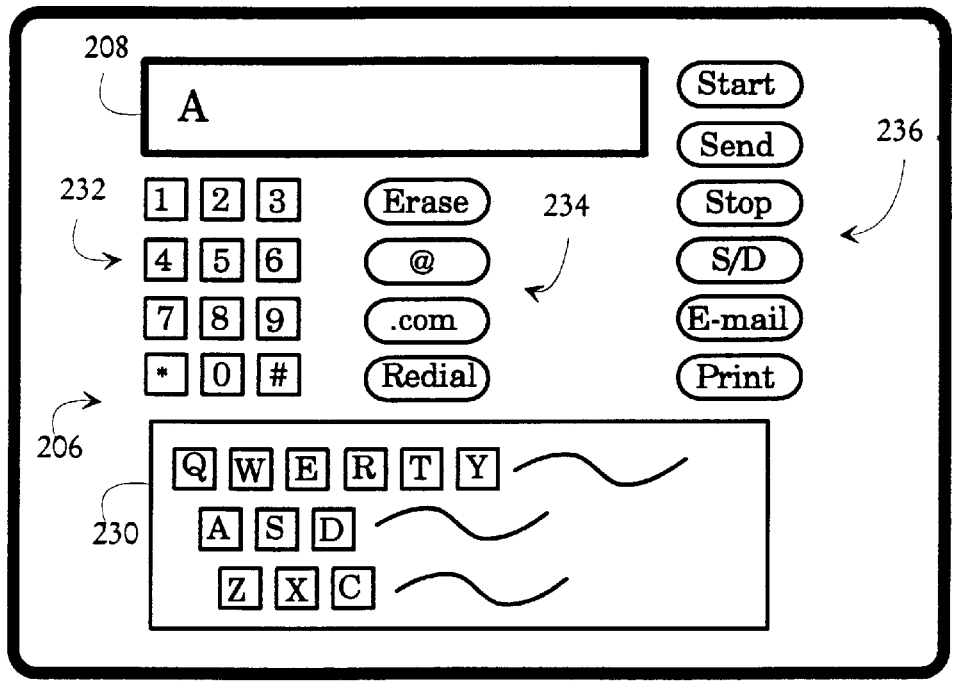
FIGS. 2(a) and 2(b) are block diagrams showing details of the keypad of FIG. 2.

Keyboard 206, shown in further detail in FIG. 2(a) along with display 208, preferably includes a QWERTY style keypad 230 for entry of alphabetic, numerical and punctuation characters, a 12 key telephone style keypad 232 for entry of numeric characters and a plurality of additional buttons seen at 234 and 236. Buttons 234 facilitate entry of destination identification information. The "Erase" button erases the last characters cited, the "@" button and ".com" button provide shortcuts for entering "@" and ".com" characters respectively, and the "Redial" button allows the previously entered telephone number or e-mail address to be reused. Buttons 236 allow for entry of commands to control operation of the device. The "Start" button clears the display 208 and allows entry of destination identification information via keypad 230. The "Send" button is depressed once the destination identification information is entered, and initiates transmission as described in more detail in FIG. 3. The "Stop" button stops current operation of the device. The "S/D" button toggles between standard and detailed scanning resolution.

Selection of standard resolution will cause generation of 200 dpi horizontally and 100 dpi vertically which scanning an image, and selection of detailed resolution will cause generation of a higher resolution, such as 200 dpi both horizontally and vertically, when scanning of an image by the scanner 204. Particularly for e-mail transmissions, higher resolutions such as 300 dpi may be used for more detailed and accurate generation of images for transmission. The "E-Mail" button initiates retrieval of e-mail from a remote mailbox in the manner more fully set forth in FIG. 4. The "Print" button allows printing of specific retrieved messages or of a retrieved list of messages.

Figure 2B:
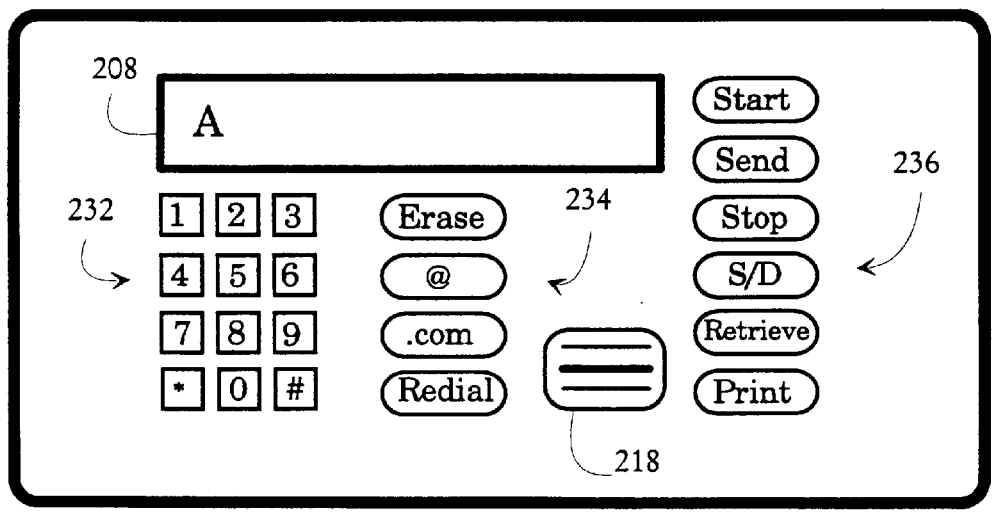

The QWERTY style keypad 230 may be replaced with a single character voice recognition module, which receives voice input through microphone 218, recognizes each alphanumeric character as it is individually broadcast in the form of a human voice and enters the recognized character as the next character in the display 208. The "Erase" button may be used to erase an incorrectly recognized character. An example of such a keyboard and display are shown in FIG. 2(b). As seen in FIG. 2(b), it may be useful to retain the telephone style keypad 232 and additional buttons 234 and 236 to facilitate entry of telephone numbers and repeat dialing. However, such buttons may be eliminated to reduce cost should voice recognition alone be deemed to be an acceptable means for entry of destination identifiers and operational commands. The most flexibility may be achieved by combining the voice recognition module with the embodiment of FIG. 2(a) to allow entry of destination identification information by voice or by touching of appropriate keys/buttons.

Other types of voice recognition may also be employed to process inputs. For example, the buttons seen at 234 and 236 may be replaced, or used in conjunction with a voice recognition module which recognizes full word spoken commands such as "start", "send", "print", "at" (for the @ button) and ".com". Even more sophisticated voice recognition may be employed to recognize full word e-mail addresses.

Display 208 may take the form of a Liquid Crystal Display (LCD) which displays alphanumeric characters to provide a visual indication of commands and destination identifications entered via keyboard 206. The LCD 208 also provides status information of the communications device such as "Connected" to indicate connection to a remote communications device, "Transmitting" to indicate transmission of information to a remote communications device, and "Disconnected" to indicate no connection with a remote communications device. Printer 210 may take the form of a plain paper type printer such as a laser or ink jet printer. For example, the printer may take the form of a laser jet type of printer available from the Hewlett-Packard Corporation, Palo Alto, Calif. The printer 210 operates to print facsimile and e-mail communications received by the communications device. Fax/data modem 212 operates in accordance with the CCITT Group III protocol to transmit and receive facsimile type information. Fax/data modem 212 also transmits and receives data in accordance with SMTP to transmit and receive electronic mail messages. Fax/data modem 212 typically communicates over a twisted-pair line which is coupled to the modem by way of an RJ-11 connector. Other embodiments may make use of a modem or similar type of device capable of communicating over different types of lines such as coaxial or fiber optic cables.

Controller 214 takes the form of a microprocessor with an associated Random-Access Memory (RAM) for temporary storage, Read-Only Memory (ROM) for storage of control programs and Non-Volatile Random-Access Memory (NOVRAM) for storage of changeable parameters. An example of such a microprocessor is the 80486 processor available from Intel Corporation, Santa Clara, Calif. Controller 214 is programmed to control the operations of components 204, 206, 208, 210, 212 and 216 by receiving inputs from components 204, 206 and 218, providing output to components 208, 210 and 216 and transmitting and receiving commands and data to and from modem 212 to control operation of the communications device.

The communications device, when coupled to a source of electrical energy preferably resets itself to a state in which either (1) a transmission of information in either facsimile or e-mail format or (2) retrieval of e-mail messages may be initiated. Initiation of either of these functions may be performed by pressing the "Start" button and then entering a destination identifier. Transmission of information is then accomplished by pressing the "Send" button and retrieval of information is accomplished by pressing the "E-mail" button. Prior to transmission of information, the "S/D" button may be pressed to select the resolution at which scanning is desired. Either transmission or retrieval of information may be terminated at any time by pressing the "Stop" button.

The functions performed by the communications device may be preferably implemented by way of a plurality of routines stored in ROM and executed by the controller 214. Such routines include for e-mail communications, a Domain Name Service (DNS) Client routine for obtaining numerical Internet Protocol (IP) addresses from an alphanumeric address entered by a user, an SMTP Mail Client routine for transmitting and receiving e-mail messages, and a TCP/IP Stack implementation for transferring information between the DNS and SMTP routines and a lower level physical interface implemented by the modem 212. For facsimile communications, image compression and decompression routines are employed to compress images to be transmitted and to decompress received images. File encoding and decoding routines operate to encode and decode transmitted and received information in accordance with UUENCODE/UUDECODE and MIME formats. A fax protocol stack handles transfer of information between the physical interface implemented by the modem 212 and the higher level encoding/decoding and compression/decompression routines. The communications device also employs a print formatter routine for formatting information to be printed and a user interface routine which displays information on the display 208 and accepts inputs entered via input devices 218, 230, 232, 234 or 236.

Figure 3:
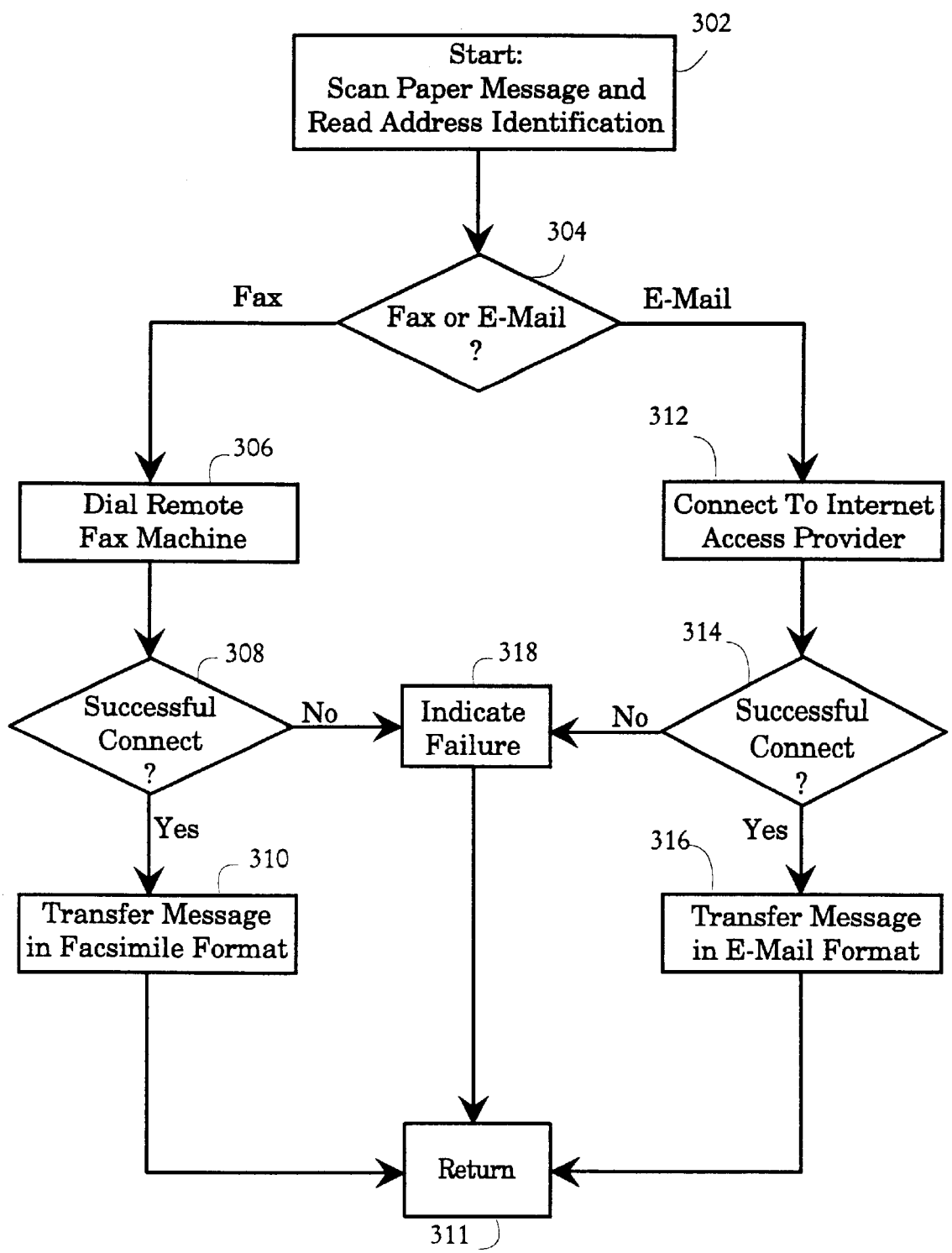
FIGS. 3 and 4 are flowcharts showing the operation of a preferred embodiment.

FIG. 3 of the drawings is a flowchart showing the functions performed by the communications device to transmit a document 101 in accordance with either a fax or e-mail transmission protocol. A user wishing to transmit a document via the communications device positions the document appropriately in the scanner 204, presses the "Start" button, enters a destination identifier via the keyboard 206 and presses the "Send" button. If the document is to be sent to a remote fax machine then the destination identification is in the form of a telephone number to identify the telephone number to be dialed in order to transmit to the remote fax machine. If the document is to be sent to a remote electronic mailbox then the destination identification is in the form of an Internet electronic mail address to identify an electronic mailbox. As is known such addresses typically take the following form:

mailboxname@domainname where, mailboxname identifies the user's electronic mailbox, and domainname identifies a domain or machine associated with the user's login account. The user's electronic mailbox implements electronic mail transmit, receive and storage functions to perform the functions of an electronic post office associated with a user with the rights to the mailbox identified by the mailboxname.

Upon pressing of the "Send" button, the communications device 100 at 302 initiates scanning of the document 101 and reads the destination identifier entered by the user. At 304, the communications device parses the destination identifier to determine if it is in the form of a telephone number or an electronic mail address. This may be done by performing the steps shown in FIG. 5 which implement a destination identifier determination routine.

Figure 5:
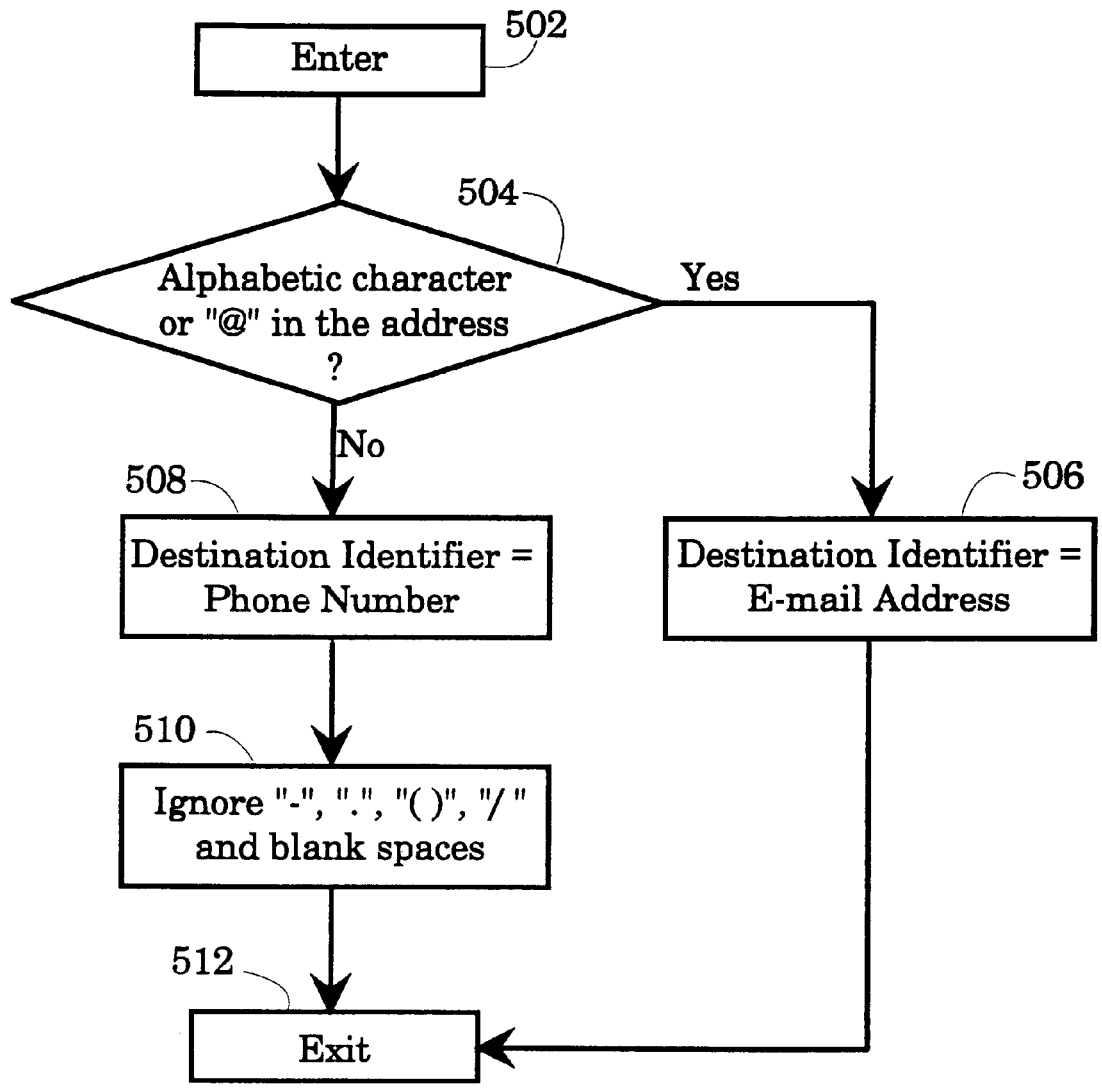
FIG. 5 is a flowchart showing further details of the flowchart of FIG. 3.

As seen in FIG. 5 the routine is entered at step 502 and at step 504, the destination identifier is parsed and if an alphabetic character, or an "@" character is found in the destination identifier then it is determined at 506 to be an e-mail address, and the routine is exited at step 512. Otherwise, the destination is determined at step 508 to be a phone number, and at step 510, extraneous characters in the identifier such as dashes, dots, parentheses, or slashes, as are commonly found in telephone numbers, are ignored in determining the telephone number identified by the destination identifier. The routine is then exited at step 512. The communications device 100 may be programmed with the local area code and country code, and if this is the case, then area codes and country codes corresponding to the stored local area and country codes are ignored in determining the destination identifier.

If the destination identifier is in the form of a telephone number then the communications device performs the functions seen at 306, 308 and 310 to transmit the information contained on the document 101 in accordance with a facsimile communications protocol to a remote facsimile device identified by the entered destination identifier. If the destination identifier is in the form of an electronic mail address, then the communications device performs the functions seen at 312, 314 and 316 to transmit information contained on the document 101 in accordance with an electronic mail protocol to a remote electronic mailbox identified by the entered destination identifier.

If at 304, the destination identifier is determined to be a telephone number, then at 306, the communications device dials the number. If at 308 a successful connection cannot be established, then at 309 the failure is indicated by generating and displaying at 318 an appropriate message on the display 208 and then returning at 311 to a mode where a new transmit or receive function may be initiated. Upon establishment of a successful connection, the communications device proceeds to transmit at 310, the information on the document 101 in accordance with a facsimile communications protocol to the remote facsimile device. The communications device then returns at 311 to a state in which it may accept a new document and destination identifier.

If at 304, the destination identifier is determined to be an e-mail address, then at 312, the communications device establishes a SLIP/PPP connection with Router 107. If a successful connection is obtained (block 314), then at 316, the information on document 101 is transmitted in accordance with the STP to a remote mailbox identified by the destination identifier. If at 314 a successfull connection with Router 107 cannot be established then the failure is so indicated on the display 208 at step 318 and the device returns at step 311 to a state where it can accept a new transmit or receive command. For transmission, at 316, the digitized information generated by the scanner 204 is encoded in accordance with the UUENCODE standard, or in accordance with the Multipurpose Internet Mail Extensions (MIME) protocol. The UUENCODE protocol/conversion utility operates to convert the binary data stream into 7-bit ASCII characters for transmission over the Internet. The MIME protocol operates to encapsulate binary attachments into an e-mail message. The e-mail message is then transmitted to the remote mailbox in accordance with SMTP. Upon transmission the communications device returns at 311 to a state in which it may accept a new document and destination identifier.

Figure 4:
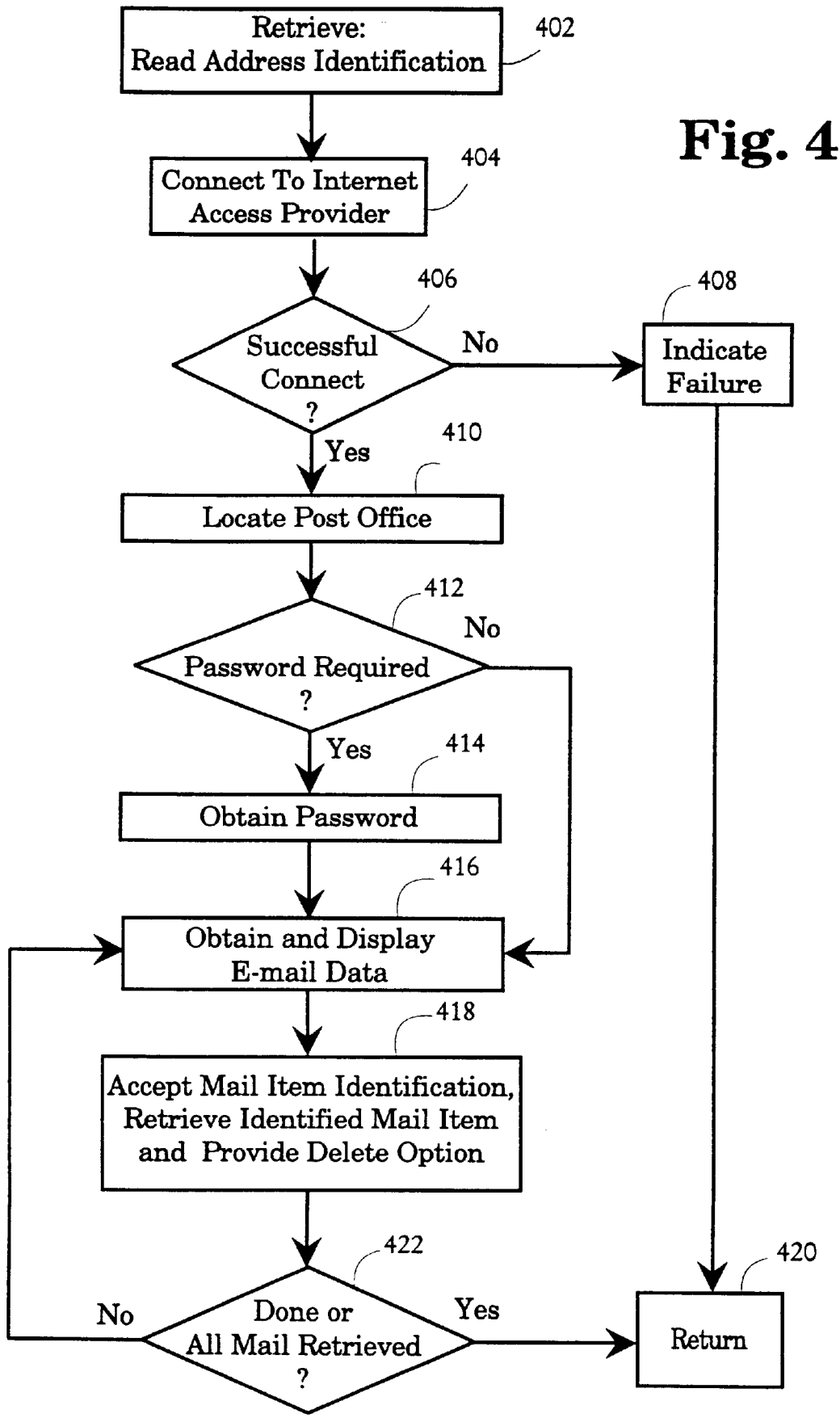

FIG. 4 of the drawings is a flowchart showing the functions performed by the communications device to retrieve e-mail stored in a remote mailbox. The functions shown in FIG. 4 and explained below may be implemented by using the functions provided by Post Office Protocol, Version 3, (POP 3). A description of the functions provided by POP 3 may be found in Internet Engineering Task Force (IETF) Request for Comments (RFC) 1460-POP 3 Protocol maintained by the Internet Activities Board.

A user wishing to retrieve e-mail from a remote mailbox presses the "Start" button, enters at 402 a destination identifier via the keyboard 206 to identify the remote mailbox and presses the "E-mail" key on the keyboard. The communications device responds at 402 by reading the destination identifier and attempting to connect to a predetermined Internet access provider, which implements the router 107 of FIG. 1, to establish a SLIP/PPP type connection. If at 406 a successful connection is not established then at 408, the failure to establish a connection is indicated on the display 208 and control returns at 420 to perform a new transmit or retrieve function. Upon establishment of a successful SLIP/PPP connection with the Router 107, the communications device locates the post office numerical Internet Protocol (IP) address corresponding to the mailbox identified at 402 using the Domain Name System (DNS). If a password is required by the mailbox identified by the destination identifier then the communications device at 414 displays a message on the display to prompt the user to enter a password. The password is transmitted to the mailbox and, if correct, then an appropriate message is transmitted by the mailbox.

Upon receipt of such a message, the communications device at 416 obtains, in accordance with the POP3 Transfer Protocol, from the remote mailbox, data indicative of the e-mail messages stored in the mailbox and displays such data on the display. For example, the data may include the number of e-mail messages stored in the mailbox and the total number of characters contained in the e-mail messages. The data may also include additional information as explained in the description of the printed listing below. The communications device then prompts the user to enter a number to retrieve a mail message, or to enter the character "a" to retrieve all mail messages. The user may print a listing of the messages contained in the mailbox to provide a paper copy which can then be referred to in selecting which messages are desired for retrieval. The printed listing of the e-mail messages may include the date of the message, identification of the sender, identification of the recipient(s), and identification of the subject matter of the message such as the information contained in the "Re:" field of many messages.

At 418, the communications device accepts the user's selection, and retrieves, in accordance with the POP3 Transfer Protocol, either the selected e-mail message or all of the e-mail messages, prints the retrieved e-mail messages on the printer 210 and prompts the user if the message or messages should be deleted. The body of the e-mail message is retrieved, including the information in fields such as "To", "From", "cc", "bc" and "RE:". Also retrieved are any attachments to the e-mail message so long as they are in text or TIFF (Tagged Image File Format) formats. If an e-mail message has an attachment which is not in text or TIFF then the attachment is not retrieved but the remainder of the message is retrieved.

If the user retrieved an individual message and then at 418 chooses to delete the retrieved message, then the communications device transmits a command to the mailbox to delete that particular message. Similarly, if the user retrieved in a single selection, all of the messages and then at 418 chooses to delete all of the messages, then the communications device transmits a command to the mailbox to delete all messages stored in the mailbox. At step 422, if the user retrieved a single message at step 418 and other messages remain in the mailbox, then the communications device returns to step 416 to obtain and display from the mailbox a new listing of the messages in the mailbox. Otherwise, if at 418 either all of the messages were retrieved or if no more messages remain in the mailbox, in the case of individual retrieval, then the communications device returns at step 420 to a state where a new transmit or retrieve operation may be initiated.

As can be seen from the foregoing description the communications device provides the functions and ease of operability which allow it to be used in a variety of locations, including office environments, home environments, and public places such as airports, etc. It is to be understood that the specific mechanisms and techniques which have been described are merely illustrative of one application of the principles of the invention. Numerous modifications may be made to the methods and apparatus described without departing from the true spirit and scope of the invention.

What is claimed is:

1. A communications device comprising:

a modem which transmits data in accordance with a facsimile transmission protocol and in accordance with an electronic mail protocol and receives data in accordance with a facsimile receive protocol and in accordance with a electronic mail protocol;

a scanner which generates digital data indicative of information on a printed medium which contains information for transmission to a remote communications device;

an information entry device for entry of information designating a destination for transmission of said information contained on said printed medium; and a controller programmed to recognize said designating destination as identifying a telephone number for causing transmission of said digital data in accordance with a facsimile transmission protocol to a facsimile device identified by said telephone number and programmed to recognize said designating destination as identifying an electronic mail address for causing transmission of said digital data in accordance with an electronic mail transmission protocol to an electronic mailbox identified by said electronic mail address, said controller further recognizing a command requesting retrieval of a listing of electronic mail messages from a specified electronic mail address and initiating communication with a remote communications device corresponding to said specified electronic mail address to cause transmission of a list of all messages from the specified electronic mail address and causing transmission of the identity of one or more messages among a received listing to retrieve a requested electronic message.

* * * * *